US007506028B2

(12) United States Patent
Mohr

(10) Patent No.: US 7,506,028 B2
(45) Date of Patent: Mar. 17, 2009

(54) INTERNET-SUPPORTED INFORMATION SYSTEM

(75) Inventor: Michael Mohr, Berg (DE)

(73) Assignee: DCi Database For Commerce and Industry AG, Starnberg (DE)

( * ) Notice: Subject to any disclaimer, the term of this patent is extended or adjusted under 35 U.S.C. 154(b) by 0 days.

(21) Appl. No.: 10/589,115

(22) PCT Filed: Feb. 8, 2005

(86) PCT No.: PCT/EP2005/001225

§ 371 (c)(1),
(2), (4) Date: Aug. 10, 2006

(87) PCT Pub. No.: WO2005/091184

PCT Pub. Date: Sep. 29, 2005

(65) Prior Publication Data

US 2007/0174392 A1 Jul. 26, 2007

(30) Foreign Application Priority Data

Feb. 20, 2004 (DE) ........................ 10 2004 008 493
Jul. 22, 2004 (DE) .................... 20 2004 011 487 U

(51) Int. Cl.
*G06F 15/16* (2006.01)
*G06F 12/00* (2006.01)

(52) U.S. Cl. ........................ 709/206; 709/207
(58) Field of Classification Search ................ 709/206, 709/207, 217, 218, 250
See application file for complete search history.

(56) References Cited

U.S. PATENT DOCUMENTS

| 6,480,885 | B1 | 11/2002 | Olivier |
| 7,069,446 | B2 * | 6/2006 | Wiederin et al. ............ 713/189 |
| 2003/0158777 | A1 | 8/2003 | Schiff et al. |

FOREIGN PATENT DOCUMENTS

| EP | 0 718 783 A1 | 6/1996 |
| EP | 0 886 228 A2 | 12/1998 |
| EP | 1 001 578 A2 | 5/2000 |
| WO | WO 01/01690 A1 | 1/2001 |

OTHER PUBLICATIONS

East West Directory.Com, Jan. 8, 2003, pp. 1-8 http://web.archive.org/web/20030108233933/http://www.eastwestdirectory.com/privacy.php.*
Hall R J: "How to Avoid Unwanted Email" Communications of the Association for Computing Machiner, Association for Computing Machinery. New York, US, vol. 41, No. 3, Mar. 1998, pp. 88-95, XP000767817; ISSN: 0001-0782, the whole document.

* cited by examiner

*Primary Examiner*—Zarni Maung
(74) *Attorney, Agent, or Firm*—Katten Muchin Rosenman LLP

(57) ABSTRACT

An internet-supported information system for selective representation of data emails (8) from a plurality of data providers (X, Y), which can be called up for a plurality of data receivers (E), comprising a central information server (1) provided with an email interface unit (4), a web interface unit (10), a memory device (6) which comprises at least one advertising storage device (7) for storing data emails (8) of data providers (X, Y), and a selection device (13); a plurality of data processing systems (2) which are respectively allocated to a provider (X, Y) and which are provided with an email interface ($5_x$, $5_Y$) which is enabled to communication with at least one provider specific email address ($4_{x,A}$, $4_{x,B}$, $4_Y$, $4y$) of the email interface unit (4) of the central information server (1), and plurality of portal servers (3) which are respectively provided with a web interface ($1i_A$, $11_B$, $11_c$) and which can be connected to the web interface unit (10) of the central information server (1), wherein the portal servers (3) have access to specific data emails ($8_{x,A}$, $8_{x,B}$, $8_{y,B}$, $8_Y$, $_c$) which are stored in the advertising memory unit (7) and which are automatically determined by the selection device (13) according to the identity of the respective portal server ($3_A$, $3_B$, $3_c$) and can represent them by means of a link on a homepage ($16_A$, $16_B$, 16,).

13 Claims, No Drawings

INTERNET-SUPPORTED INFORMATION SYSTEM

This application is the National Stage of International Application No. PCT/EP2005/001225, filed Feb. 8, 2005, which claims the benefit under 35 U.S.C. 119 (a-e) of German Application No. 10 2004 008 493.9 filed Feb. 20, 2004, and German 20 2004 011 487.9 filed Jul. 22, 2004, which is herein incorporated by reference.

The present invention relates to an Internet-supported information system for selective representation of data records from a plurality of data providers, particularly the form of an Internet-supported system for selective representation of data emails from a plurality of data providers. In addition, it relates to a procedure to obtain Internet-supported information of data receivers through advertising data of data providers.

Particularly the trade in goods has been increasingly shaped by temporary sales actions in the past few years and in fact against the background that the traders concerned can obtain particularly favorable purchasing conditions and can avoid costly warehousing with the respective manufacturer thanks to the short-term sales and larger quantities comparatively speaking. Informing the addressed potential clientele about the respective sales action, particularly via the so-called newsletter sent by email, is directly connected with this. In Germany alone, millions of these newsletters are sent on a daily basis.

Only a fraction of the emails that were sent accordingly are in fact read and awakens the addressee's interest in the advertised goods. On the other hand, the receivers do not even take note of the respective content of the majority of these emails. The currently practiced system to inform addressed potential customers about sales actions in particular shows three disadvantages: on the one hand, the data networks are clogged by objectively redundant data transfers. Furthermore, the addressed customers, who receive a flow of all types of corresponding advertisings day-to-day, . . . increasingly regard this as harassment and often spontaneously delete the unread newsletter addressed to them in their anger, and in fact even when the content could potentially be of interest to them. Finally, only the potential customers are reached who participate in email traffic and the email addresses of whom are known by the respective provider.

Patent US 2003/0158777 A1 reveals an Internet-supported information system, wherein registered users can connect to an administration server or create multiple user portfolios. The advertising banners or other advertising news shown to the respective user are restricted and selected, respectively, according to the specific data provided in the respective user portfolio, which reflect the interests of the registered user concerned. However, not every Internet user is willing to disclose private data about oneself so that there is an essential disadvantage of this system in the necessarily missing anonymity.

The same problems arise in the procedure described in U.S. Pat. No. 6,480,885 B1 for the dynamic matching of user-specific selection criteria in the framework of group emails or group forums on the Internet. The registration of system users is namely also mandatory in this case, since said matching of the selection criteria can only be realized with the help of the user profile data that are to be created beforehand.

In light of the facts of the case demonstrated as aforesaid, the present invention is based on the task of providing an Internet-supported information system of the type indicated at the beginning, which avoids . . . the abovementioned disadvantages of the status of technology in case of an increased degree of reaching the addressed data receivers.

This problem is solved according to the present invention by means on an Internet-supported information system for selective representation of data emails from a plurality of data providers, which can be called up for a plurality of data receivers, comprising:
- a central information server provided with and email interface Unit, a web interface unit, a memory device, which comprises at least one advertising storage unit to store data emails of the data providers, and a selection device,
- a plurality of data processing systems, which are respectively allocated to a data provider and which are provided with an email interface unit which is enabled to communicate with at least one provider-specific email address, and
- a plurality of portal servers, which are respectively provided with a web interface and which can be connected to the web interface unit, wherein the portal servers have access to specific data emails, which are stored in the advertising memory unit and which are automatically determined by the selection device according to the identity of the respective portal server, and can represent them by means of a link on a homepage.

An initial aspect of the present invention is, consequently, the fact that the data, which are sent by the data providers as emails (e.g. newsletter), and which are stored in the central information system by every potential data receiver who has an Internet-compatible data processing system, can be retrieved via . . . the world-wide-web and in fact irrespective of the fact whether the corresponding potential data receiver participates at all in email traffic or not. An additional aspect, which is even more significant in practice, consists of the fact that the stored emails are automatically sorted and selected on the central information server, which is fed with data emails from all types of providers, whereby the selection is made according to the identity of the respective portal server, through which the data receiver concerned accesses the central information server; consequently, different data emails, which are stored in the central information server, are made available for the individual portal servers, which have access to the central information server via a link on their homepage. As a result, a selection is made from the entirety of data emails stored in the central information server depending on the (current) supply and demand of the respective data receiver which is expressed in the use of a certain portal server that corresponds to his current interest. This results in the fact that the corresponding data receiver can locate the data interesting to him in an easier and faster way (e.g. advertisings). Figuratively speaking, the data receiver walks through a virtual topic street, in the virtual display window of which he can observe the data emails of the most diverse providers for this complex of topics. For instance, in this sense, data emails that relate to the trade with EDP-hardware and software can be retrieved via a link on a homepage of a portal server that deals with this subject matter, whereas such data emails, which relate to the toys trade, can be retrieved via a link on the homepage of another correspondingly oriented portal server, and data emails, which relate to the trade in drugstore products, . . . can be retrieved via a link on the homepage of, in turn, another correspondingly oriented portal server. All current file and email formats, respectively (such as plain-text, html, PDF, all popular graphics formats, etc.) that are presentable on the web can thereby be presented in an ideal manner in order to allow the data providers the largest possible flexibility to design the data emails. Another aspect of the present invention consists in the fact that data emails can be retrieved for the entire duration of validity of the corresponding advertising; in this way it is out of the question that they are deleted prematurely by potential customers and, as a result, are no longer available to them. Furthermore, the fact that the potential data receivers (advertising receivers) have access to a clearly wider margin of advertisings, as a result of which they are put in the position to investigate each time the advertising that is most favorable for them, is to the benefit of the system according to the invention. The fact that they do not need to disclose their own email address to others and should, consequently, not be worried of being overwhelmed with newsletters henceforth, is a decisive advantage for the acceptance of the system according to the invention. It is already clear from the aforementioned that the system according to the invention bestows a great advantage of efficiency on the plurality of data providers, wherein the latter can reach a plurality of data receivers by sending a unique data email to the email interface unit of the central information server.

The portal-specific access to individual data emails that have been stored on the central information server can be realized in the framework of the system according to the invention, particularly by the fact that the links of the individual portal servers access different, portal-specific websites through which . . . only the data emails, which are selected specifically for the portal by the selection unit and are released by the corresponding portal server for access, can be retrieved.

The automatic selection of certain data emails made by the selection device preferably also considers in this respect guidelines of the data providers connected to the system according to the invention, when the data providers can determine through which portal servers, subject to the consent of the portal operator concerned, their data emails should have been retrieved and which portal server, if applicable, despite an actual suitable thematic device, should not have access to their data emails. In this respect, the selection device preferably comprises an appropriate memory unit for the relevant provider-specific input of portal servers with authorization to access their data emails.

The involvement of corresponding protective mechanisms also constitutes an important contribution to the acceptance of the system by data providers, data receivers and topic portals. Procedures known as such are hereby considered, wherein for instance the contact data such as source identifier or IP-address are used for authentication purposes.

The interest of a portal server operator that the user is really only provided with the data emails that correspond to his target group is accommodated by filtering the data emails in the selection device according to corresponding keywords or by means of other commonly used filtering programs. For this reason, particularly a misuse of the system by the data providers can be prevented, who sign on as data providers in a certain area (e.g. demand in handymen), however, want to store data emails with other content (e.g. eroticism) in the system.

Such a "content filtering" can, when needed, also be realized by the operator of the central information server by means of random tests. It can also be designated to give the operators of portal servers the possibility of excluding undesired data providers from advertising on their portal server.

The abovementioned implementations and clarifications of the present invention show that the information system according to the invention can be operated with a lot of benefits and unmanageable advantages without the data receivers (e.g. potential customers and other advertising receivers) having to step out of anonymity. On the other hand, the system according to the invention can be studied further in a particularly advantageous manner in many respects when individual or all data receivers are signed on and registered. In this case for instance, the respectively registered user (data receiver) can define a user profile that is stored in a corresponding user database within the memory unit of the central information server. Such a user profile can thereby contain certain user-specific filtering functions, which are considered by the selection device when automatically selecting the data emails that can be retrieved via the used portal server and, if applicable, their user-specific representation. The respective user profile can thereby be considered by the selection unit irrespective of the fact via which portal server the user concerned accesses directly the central information server; this facilitates the use of the system according to the invention for the data receivers who access the central information server via different portal servers. Data of the respective user (data receiver) relating to different data providers, for instance customer numbers of the data receiver (customer) in question, can thereby be stored with different data providers (traders), . . . which facilitates balancing the system according to the invention with the data providers' own data processing systems. Additionally, the user can be given the possibility in his user profile through correspondingly adjusted criteria to provide for a presorting, effective on all portal servers, of the data emails represented in corresponding order, for instance according to the proximity of the provider to his residence or the cycle of the advertising action. In order to log in registered users in the system, possibilities known as such are available for this purpose.

According to a preferred further study of the invention, the operators of the portal servers, which are connected to the system according to the invention, can design the selection device specifically for the portal, wherein the corresponding device data can be stored in a portal database of the information server. In this sense, a certain representation, make-up, sorting and/or detailing of the data emails, which are accessible via the relevant portal server, will be determined particularly through corresponding portal-specific requirements. In this way, one and the same data email of a certain provider can be represented in different manners according to the identity of the portal server via which it is called up. As a result, the quest of individual portals for a unique corporate identity is accommodated. The content or subject headings of the content-specific data emails, giving access to a portal, can also be provided as so-called XML-stream by the central information server. This XML-stream can be represented there in the form of a news ticker or can be prepared for mobile applications.

A preferred further study of the system according to the invention is characterized by the fact that, in addition, the memory unit of the central information server features a provider database for the available preparation of provider-specific data, wherein the respective advertising email and the provider-specific data can be automatically linked with one another for each provider. In this sense, particularly relevant information for the addressed customers, for instance delivery times, shipping costs, terms and conditions for the return of obtained goods and the same provider-specific data can be represented according to a unified diagram for all providers connected to the system. Consequently, the advertising receivers do not need to study the valid general business conditions, which is connected with an unarguable expenditure according to experience, but rather have access, in a comparable form, to the relevant information of all providers who are active in the respectively interesting subject area.

Furthermore, it can be intended to make a module, which is automatically generated from the provider data of the central information server, available for the providers of data emails, with which they could inform on their own homepage via which portal server their current data emails, which are stored on the central information server, can be retrieved for a user.

According to another preferred further study of the invention, it is intended that the provider-specific data, which are stored in the provider database, each time contain a link to an Internet presence of the provider concerned. This is particularly of interest for providers who offer goods from different lines of business (e.g. hardware store, handyman market, garden market); due to the portal-specific selection of the data emails, . . . the data receiver only has access to part of the advertisings (e.g. only demand for handymen) of such providers via the original access. In the event that he uses said link to the internet presence of the provider concerned, he can inform himself there about the entire advertising of the provider concerned that is presented there.

In view of such providers, who offer goods from different lines of business, it could be convenient when multiple content-specific email addresses are allocated to individual providers on the email interface unit of the central information server. In this case, the corresponding providers send the individual emails, which relate to different lines of business, to different email addresses and thus contribute themselves to some kind of presorting that is considered by the selection device of the central information server. The email addresses on one or multiple areas of expertise that are allocated to a respective provider in a content-specific manner are thereby advantageously and automatically generated by a corresponding email address creation and allocation unit of the central information server.

According to another preferred further study of the invention, the memory unit of the central information server also comprises an archive to make previous data emails available. The advertising receivers can implement helpful market studies for their purchasing decisions by using archived, old, no longer updated data emails accordingly.

The memory device of the central information server can also be advantageously used for the fact that a signed on data receiver, who has been allocated a corresponding user profile, is given the possibility . . . to conclude some type of membership for certain or groups of data emails. This can be developed in such a way that the user (data receiver) for instance is either informed about the arrival of all data emails of certain providers or certain content by email in intervals allowed by him, or the user is sent all content-specific emails of certain data providers collectively by email from the central information server in intervals allowed by him. The user can thereby select from a plurality of data providers or contents connected to the system and can simply cancel the membership again by changing his user profile.

The data receiver who is signed on with a user profile can also be given the possibility that he can request any newsletter provider, in whose newsletter he is in fact principally interested, however, which he does not want to be sent to his email address anymore in the future, to send these emails to an automatically generated email address of the central information server in the future. For this purpose, a plug-in for instance for usual email administration programs, such as Outlook or Outlook Express, can be made available to a signed on user. According to the selected newsletter, this plug-in automatically generates a call letter for the provider in which the newsletter provider is requested to send the emails sent to this special user to a certain email address of the email interface unit of the central information server. Depending on the wish of the provider, either the respective user or the portal server, from a content-specific point of view, could access this data email.

Another preferred further study of the invention is characterized by the fact that, furthermore, the selection device comprises a content selection module to select such data emails stored in the advertising memory unit and accessible via the respectively used portal server, which correspond to the content selection criteria selected by the respective advertising receiver. In this regard, the content selection module can for instance browse the portal-specific, accessible data emails in view of the application of certain terms. In this way, advertising receivers who are looking for a very particular commodity are given an easier time to locate the corresponding advertising. For clarification purposes, it is alluded that the term 'content selection criteria' cannot be narrowly interpreted in this context. It can for instance be intended that additional content selection criteria are allocated to the data emails by the provider, which go beyond the pure topic as regards content. Such a content selection criterion could for example provide for the classification of the data emails in advertising, editorial information, customer information, press information, etc., whereby it is also thinkable of making a selection according to hierarchy levels of the trade in for example manufacturers, importers, distributors, traders and end customers. If the system according to the invention provides for the possibility to register data receivers (see above), the content selection criteria, which have been selected by the respective data receiver, can be stored in the user database as part of the user profile.

According to another preferred further study of the invention, it is furthermore intended for the selection device to comprise a provider selection module to select such data emails that are stored in the advertising memory unit and are accessible via the . . . respectively used portal server, which correspond to the provider selection criteria chosen by the respective advertising receiver. Such provider selection criteria can for instance consist of the provider's registered office whereby a selection according to the zip code areas is to be considered or also the condition of the transmission exempt from charges. As was the case before, the provider selection criteria chosen by the respective data receiver can be stored in the user database as part of the user profile, provided that the system according to the invention provides for the registration of the data receiver (see above).

Additionally, the central information server can comprise of an action device to implement the predetermined processes, which are selectable by and have been defined by the respective advertising receiver, in view of the allocated provider of the respectively retrieved and active data emails. In this respect, retrievable standard processes can particularly consist of all advertising services, in other words, particularly predefined data exchange processes via standardized interfaces. Another standard process, which can be selected by the advertising receiver, can for instance be call-back process in this respect, in the selection of which the provider is informed about the wish of the advertising receiver of being called back by the provider concerned at a telephone number to be indicated by the advertising receiver. More such standard processes can for instance also constitute a purchasing process or a catalog ordering process, in the selection of which either the advertising receiver can directly buy the article advertised in a data email from the provider with the mention of a delivery address and the desired payment method, or a catalog of the provider is forwarded to the advertising receiver at an address to be indicated by the latter. If the system according to the invention does not provide for the registration of the data receiver . . . (see above), the call-back number, address or bank details and credit card information, respectively, which are indicated once by the respective data receiver, can be stored in the user database as part of the user profile. A connection can to a certain or multiple E-cash systems for the cashless payments on the Internet can also be created with the aid of the user profile, wherein the selected pre-settings and payment methods, respectively, can be directly adopted when making a purchase. The risk of contract breach is principally minimized and can for instance be assured by the system provider since both contractual partners can be authenticated by the system provider in such a business dealing.

Advantageously, the retrieval of advertising emails by advertising receivers with allocation of the respectively used portal server and logging of all recordable data of the respective access and of the transaction, if applicable, resulting from it, is automatically recorded and registered for the commercial use of the present invention. In this respect, one can also fall back on all suitable devices known as such. Such an automatic collection of the access and transaction data enables the automatic determination of a payment to be made from the provider to the operator of the central information server and/or the operators of the portal servers that depends on the number of accesses and, if applicable, its outcome. The participation of the data receiver in the costs will also be considered particularly when the system according to the invention provides for the registration of the data receiver (see above). It can also be intended that the operators of portal servers are billed for the preparation of the central information server. These obtain namely a surplus value for their portal through the system according to the invention, . . . while the users of their topic portal are supplied with a comprehensive system on which the users can find and analyze additional information directly from corresponding providers specifically for the topic.

The logged data can thereby also be used for a type of "assessment" of the data emails of several data providers, while for instance the number of accesses to a certain data email by different users (data receivers) is analyzed. However, a device can be provided which gives the users themselves the possibility of judging a retrieved data email in view of different criteria, whereby these assessments are then made available for the other users, if applicable, only signed on users.

Yet another preferred further study of the system according to the invention is characterized by the fact that at least a few provider data processing systems each comprise a web server with a web interface unit and a memory device accessible via the web interface unit for provider-specific data records stored in an Internet-compatible format, whereby the central information server comprises a memory unit with the contact data relating to the link connection to the provider web servers and whereby the portal servers have access to the provider data records via the information server from specific providers which are detected by the selection device depending on the identity of the respective portal server, and can thereby display these provider data records via a link on a homepage. In this way, it is possible for the advertising receivers, in addition to the those data emails, which were selected according to their specific supply and demand that is expressed by the identity of the respectively used portal server, . . . also to display websites of those providers on the same surface, who are active in the relevant area. Once again, the providers are selected to whose website the respective advertising receiver has access according to the identity of the portal server used by him.

According to a second embodiment of the invention, which is also established based on the principles clarified above, an information system is realized following the abovementioned executions, in which the providers do not send data emails to the central information server but instead provide their advertising alone on provider-specific web servers to be accessed by potential advertising receivers, and namely in the form of dynamic, regularly updated websites. Such an Internet-supported information system for selective representation of data records of a plurality of providers comprises a plurality of web servers which are each allocated to a provider, which feature a web interface unit and comprise a memory device that is accessible via the web interface unit for provider-specific data records stored in an Internet-compatible format, a central information server with a web interface unit, a memory unit with the contact data relating to the link connect ion to the provider web servers, as well as a selection device and a plurality of portal servers, which are each comprised of a web interface and can be connected to the web interface unit of the central information server, whereby the portal servers have access to provider data records via the information server from specific providers that are detected by the selection device according to the identity of the respective portal server and can then display then via a link on a homepage.

The automatic selection of the advertising data according to the identity of portal server used by the respective advertising receiver, which is relevant for the present invention, is used in the same manner in this embodiment as in the system built up by data emails and further described and clarified above, so that the same points of view and advantages apply for this second embodiment as for the first embodiment.

Although the present invention can be used in the area of merchandise trade in a particular way and was clarified on these grounds as aforesaid in connection with this application, the invention cannot at all be restricted to this field of application. In fact, the present invention can clearly be applied to a plurality of other fields of application with the same advantages, wherein an automatic pre-selection is to be made for data receivers from data according to the respective supply and demand in order to facilitate the respective data receiver's task of finding the data of interest to him. In this respect, the previously used terms as "advertising", "advertising receiver", "provider" and the like are not to be understood in a manner restricting the merchandise trade.

For clarification purposes, it is alluded that the terms "portal" and "portal server" cannot be narrowly interpreted . . .

This does not at all include portals (internet display windows) in the narrow sense. In fact, various registers are also considered "portals" in the framework of the present invention. This register lists data providers connected to the system, for instance indexes of the chambers of industry and commerce, branch register, exhibitor lists and the like. In this case, the entry, which relates to the respective data provider, in the register is linked with the central information server, wherein the selection device is tuned in such a way that only data emails of the very data providers can be accessed via this link.

The present invention is clarified hereinafter on the basis of a preferred execution sample illustrated in the drawing, whereby the displayed system serves the information of potential customers via the current advertisings of retailers.

The system comprises a central information server 1, two data processing systems 2 of which a provider X is allocated to data processing system 1 and a provider Y is allocated to a data processing system 2, as well as three portal servers 3, the portal server $3_A$ of which is thematically directed to area of expertise A, and portal server $3_B$ is directed to area of expertise B and portal server $3_C$ to area of expertise C. Provider X is active in the business areas A and B. Provider Y, on the other hand, is active on the business areas B and C.

The central information server comprises an email interface unit 4 with which provider data processing systems $2_X$ and $2_Y$ can communicate via these respectively allocated email interfaces $5_X$ and $5_Y$, respectively. Two email addresses are thereby allocated to providers X and Y . . . namely the addresses $4_{X,A}$ and $4_{X,B}$ to provider X and the addresses $4_{Y,B}$ and $4_{Y,C}$ to provider Y. In this way, provider X directs his data emails, which contain his advertising relating to business area A, to email address $4_{X,A}$ and his data emails, which contain his advertising relating to business area B, to email address $4_{X,B}$; and provider Y directs his data emails, which contain his advertising relating to business area B, to email address $4_{Y,B}$ and his data emails, which contain his advertising relating to business area C, to email address $4_{Y,C}$.

Central information server 1 comprises a memory device 6 containing an advertising memory unit 7 in which data emails 8, which contain the respectively current advertising of the affiliated providers, can be stored, namely the existing data emails $8_{X,A}$, $8_{X,B}$, $8_{Y,B}$ and $8_{Y,C}$. When entering the corresponding data emails, the no longer current data emails are moved from advertising memory unit 7 to an archive 9 which is part of memory device 6.

Furthermore, central information server 1 features a web interface unit 10 through which portal servers 3 have access to central information server 1 via these respectively allocated web interfaces 11. Each of the three portal servers 3 can thereby be connected to central information server 1 via a link on an existing homepage. Nevertheless, the links on the individual portal servers are intertwined with different URLs. In this way, portal server $3_A$ is connected to URL $10_A$, which is allocated to a website $12_A$ in which data email $8_{X,A}$ is embedded. Portal server $3_B$ is connected to URL $10_B$, which is allocated to a website $12_B$ in which a list with data emails $8_{X,B}$ and $8_{Y,B}$ is embedded.

And portal server $3_C$ is connected to URL $10_C$, which is allocated to a website $12_C$ in which data email $8_{Y,C}$ is embedded. In this way, a selection device 13 is created in the sense that any potential advertising receiver E, who visits homepage $16_A$ of portal server $3_A$ by using web browser 14 of his PC 15 equipped with an Internet access port and is transferred to central information server 1 by clicking the links embedded there, can only see website $12_A$ with data email $8_{X,A}$, whereas, when he is transferred to central information server 1 by clicking the links embedded on homepage $16_B$ of portal server $3_B$, he can only see website $12_B$ with data emails $8_{X,B}$ and $8_{Y,B}$.

Websites $12_A$, $12_B$ and $12_C$ are constructed according to a consistent scheme so that the advertising receivers can find their way and move around on these websites without complex orientation. The websites 12 each contain a link 17 via which the respective advertising receiver E can reach a website that represents the provider-specific data on each provider (e.g. Y) which are stored in provider database 18, from which the respectively active data email (e.g. $8_{Y,B}$) originates. A call-back program is opened by clicking another link 19 on website 12. The program automatically informs the provider (e.g. Y) of the respectively active data emails (e.g. $8_{Y,B}$) about the wish of advertising receiver E of being called back at a telephone number to be indicated by the latter. Another link 21 on website 12 leads to an Internet presence of the provider concerned. A search program 23 is opened by clicking another link 22 on website 12.

This program checks the data emails ($8_{X,B}$ and $8_{Y,B}$), . . . which are allocated to the corresponding website (e.g. $12_B$), for the use of a certain term or other search criteria. A list is created of earlier, no longer current data emails of the provider of the respectively active data email, which are stored in archive 9.

The invention claimed is:

1. Internet-supported information system for selectively displaying at least one data email of a plurality of data emails provided by a plurality of data providers (X,Y) to at least one selected receiver of plurality of data receivers, the internet-supported information system comprising:
    a central information server (1) comprising an email interface unit (4), a web interface unit (10), a memory device (6), and a selection device (13); the memory device (6) comprising an advertising memory unit (7) storing a plurality of data emails (8) provided by the plurality of data providers (X,Y), the email interface unit comprising a plurality of provider-specific email addresses, wherein each provider-specific email address is allocated to one individual data provider and serves as a means for receiving the data emails from said one individual data provider, to whom it is allocated;
    a plurality of data processing systems (2), each of the plurality of data processing systems being allocated to a respective one of the plurality of data providers (X,Y), each of the plurality of data processing systems comprising an email interface (5.sub.x, 5.sub.Y) in communication with one of a plurality of provider-specific email addresses (4.sub.X,B. 4.sub.Y,B, 4.sub.Y,C); and
    a plurality of portal servers (3), each of the plurality of portal servers comprising a web interface (11.sub.A, 11.sub.B, 11.sub.C) in communication with the web interface unit (10); and
    wherein the selection device (13) comprises a memory unit for provider-specific input concerning an identity of the portal servers (3) with authorization to access data emails (8) from specific data providers (X,Y),
    wherein the selection device automatically determines the at least one data email for display to the receiver of the plurality of receivers according to the respective portal server;
    wherein the at least one data email is represented via a link on a homepage (16.sub.A, 16.sub.B, 16.sub.C).

2. System according to claim 1, wherein the memory device (6) of the central information server (1) further comprises a provider database to prepare provider-specific data, wherein data emails from one provider and the provider-specific data of the same data provider are automatically associated with one another for each provider (X,Y).

3. System according to claim 2, wherein the provider-specific data, which are filed in the provider database (18), each contain a link to an Internet presence of the provider concerned (X,Y).

4. System according to claim 1, wherein the memory device (6) of the central information server comprises an archive (9) to retrieve data emails (8) of the plurality of data emails.

5. System according to claim 1, wherein the selection device (13) further comprises a content selection module to select specific data emails (8);
    wherein the specifically selected data emails correspond to the content selection criteria selected by the receiver.

6. System according to claim 1, wherein the selection device (133) comprises a content selection module to select specific data emails (8);
   wherein the specifically selected data emails correspond to the provider selection criteria selected by the receiver.

7. System according to claim 1, wherein the central information server (1) comprises an action device to implement predetermined processes, which are selected by one of the plurality of receivers in view of a selected data email and which is allocated to one of the plurality of data providers associated with the selected data email.

8. System according to claim 1, wherein the links access different portal-specific websites (12.sub.A, 12.sub.B, 12.sub.C), via which only selected data emails (8) are retrieved, which are respectively chosen, specifically for the one of the portal servers associated with the receiver, by the selection unit (13) and are released for access.

9. System according to claim 1, characterized by the fact that multiple content-specific email addresses (4.sub.X,A, 4.sub.X,B, 4.sub.Y,B, 4.sub.Y,C) are allocated to at least one of the plurality of data providers (X,Y) on the email interface unit (4) of the central information server (1).

10. System according to claim 1, characterized by the fact that at least two of the plurality of data processing systems comprise a web server with a web interface unit and a memory device accessible via the web interface unit for provider-specific data records stored in an Internet-compatible format
   wherein the central information server (1) contains a memory unit with the contact data relating to a link connection to the specific data providers from the plurality of data providers, and wherein the portal servers have access to provider-specific data records via the central information server from specific providers which are detected by the selection device depending on the identity of the respective portal server, and can thereby display these provider data records via the link on the homepage.

11. A method for Internet-supported information from a plurality of data receivers (L) via advertising of a plurality of data providers (X,Y), the method comprising the following steps:
   Preparation of a central information server (1) with an email interface unit (4), the email interface unit comprising a plurality of provider-specific email addresses, a web interface unit (10), and a memory device (6); the memory device comprising at least one advertising memory unit (7);
   allocating each of the plurality of provider-specific email addresses to one individual data provider;
   Preparation of a plurality of portal servers (3), each of the plurality of portal servers comprising a web interface unit (3) and each of the plurality of portal servers being connected to the web interface unit (11) of the central information server (1);
   Sending advertising emails (8) containing provider-specific data by means of a plurality of data processing systems (2), each of the plurality of data processing systems being allocated to a data provider (X,Y), each of the advertising emails being sent by one specific data provider to the at least one provider-specific email address (4.sub.X,A, 4.sub.X,B, 4.sub.Y,C, 4.sub.X,C) of the central information server (1), which is allocated to said specific data provider;
   Automatic storage of the advertising emails (8), which enter central information server (1) in advertising memory unit (7);
   Enabling the creation of connections between a plurality of data processing systems (15), which are each allocated to one of the plurality of data receivers (E) and feature a web interface (14), and central information server (1) by using a link of one of the plurality of portal servers (3) which is retrieved by the one of the plurality of data receivers;
   Providing a memory unit for provider-specific input concerning the identity of the one of the plurality of portal servers (3) with authorization to access the plurality of data emails (8) from specific ones of the plurality of data providers (X,Y);
   Automatic selection of, which depends on the identity of the one of the plurality of portal servers (3), and access clearance to the advertising emails (8) stored in the advertising memory unit (7);
   Retrieval of the selected and cleared advertising emails through the plurality of advertising receivers on the world wide web.

12. The method according to claim 11, wherein the retrievals of advertising emails (8) by the one of the plurality of data receivers (E) is recorded and registered with allocation of the one of the plurality of portal servers(3).

13. The method of according to claim 11, wherein
   each of the plurality portal servers (3) access different, portal-specific websites (12) via the respective link, wherein only the advertising emails (8), which have been selected specifically for the one of the plurality of portal servers and have been cleared for access, are retrieved through these websites.

* * * * *

UNITED STATES PATENT AND TRADEMARK OFFICE
CERTIFICATE OF CORRECTION

PATENT NO. : 7,506,028 B2  Page 1 of 2
APPLICATION NO. : 10/589115
DATED : March 7, 2009
INVENTOR(S) : Mohr It is certified that error appears in the above-identified patent and that said Letters Patent is hereby corrected as shown below:

Delete title page, and replace with new title page. (attached)

Insert the lone drawing fig,
--

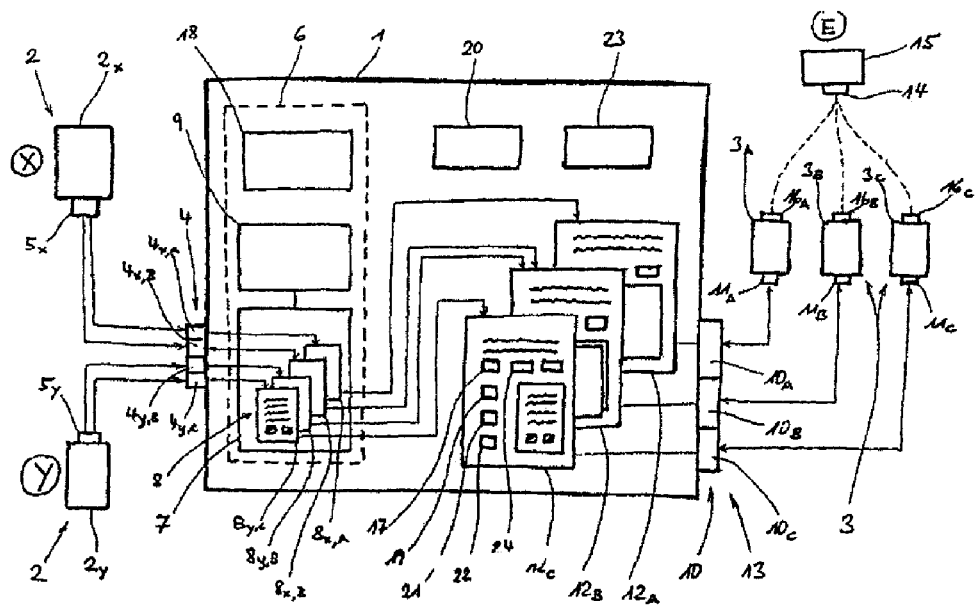

--.

Signed and Sealed this

Eighth Day of December, 2009

David J. Kappos
*Director of the United States Patent and Trademark Office*

(12) United States Patent
Mohr

(10) Patent No.: US 7,506,028 B2
(45) Date of Patent: Mar. 17, 2009

(54) INTERNET-SUPPORTED INFORMATION SYSTEM

(75) Inventor: Michael Mohr,-Berg (DE)

(73) Assignee: DCI Database For Commerce and Industry AG, Starnberg (DE)

(*) Notice: Subject to any disclaimer, the term of this patent is extended or adjusted under 35 U.S.C. 154(b) by 0 days.

(21) Appl. No.: 10/589,115

(22) PCT Filed: Feb. 8, 2005

(86) PCT No.: PCT/EP2005/001225

§ 371 (c)(1),
(2), (4) Date: Aug. 10, 2006

(87) PCT Pub. No.: WO2005/091184

PCT Pub. Date: Sep. 29, 2005

(65) Prior Publication Data

US 2007/0174392 A1 Jul. 26, 2007

(30) Foreign Application Priority Data

| Feb. 20, 2004 | (DE) | 10 2004 008 493 |
| Jul. 22, 2004 | (DE) | 20 2004 011 487 U |

(51) Int. Cl.
*G06F 15/16* (2006.01)
*G06F 12/00* (2006.01)

(52) U.S. Cl. ............................ 709/206; 709/207
(58) Field of Classification Search ............ 709/206, 709/207, 217, 218, 250
See application file for complete search history.

(56) References Cited

U.S. PATENT DOCUMENTS

| 6,480,885 B1 | 11/2002 | Olivier | |
| 7,069,446 B2 * | 6/2006 | Wiederin et al. | 713/189 |
| 2003/0158777 A1 | 8/2003 | Schiff et al. | |

FOREIGN PATENT DOCUMENTS

| EP | 0 718 783 A1 | 6/1996 |
| EP | 0 886 228 A2 | 12/1998 |
| EP | 1 001 578 A2 | 5/2000 |
| WO | WO 01/01690 A1 | 1/2001 |

OTHER PUBLICATIONS

East West Directory.Com, Jan. 8, 2003, pp. 1-8 http://web.archive.org/web/20030108233933/http://www.eastwestdirectory.com/privacy.php.*
Hall R J: "How to Avoid Unwanted Email" Communications of the Association for Computing Machiner, Association for Computing Machinery. New York, US, vol. 41, No. 3, Mar. 1998, pp. 88-95, XP000767817; ISSN: 0001-0782, the whole document.

* cited by examiner

*Primary Examiner*—Zarni Maung
(74) *Attorney, Agent, or Firm*—Katten Muchin Rosenman LLP

(57) ABSTRACT

An internet-supported information system for selective representation of data emails (8) from a plurality of data providers (X, Y), which can be called up for a plurality of data receivers (E), comprising a central information server (1) provided with an email interface unit (4), a web interface unit (10), a memory device (6) which comprises at least one advertising storage device (7) for storing data emails (8) of data providers (X, Y), and a selection device (13); a plurality of data processing systems (2) which are respectively allocated to a provider (X, Y) and which are provided with an email interface ($5_x$, $5_Y$) which is enabled to communication with at least one provider specific email address ($4_x A$, $4_{x,B}$, $4_Y$, $4y$) of the email interface unit (4) of the central information server (1), and plurality of portal servers (3) which are respectively provided with a web interface ($11_A$, $11_B$, $11_c$) and which can be connected to the web interface unit (10) of the central information server (1), wherein the portal servers (3) have access to specific data emails ($8_x A$, $8_x B$, $8_y B$, $8_Y$, $_c$) which are stored in the advertising memory unit (7) and which are automatically determined by the selection device (13) according to the identity of the respective portal server ($3_A$, $3_B$, $3_c$) and can represent them by means of a link on a homepage ($16_A$, $16_B$, $16_c$).

13 Claims, 1 Drawing